No. 788,947.                                               Patented May 2, 1905.

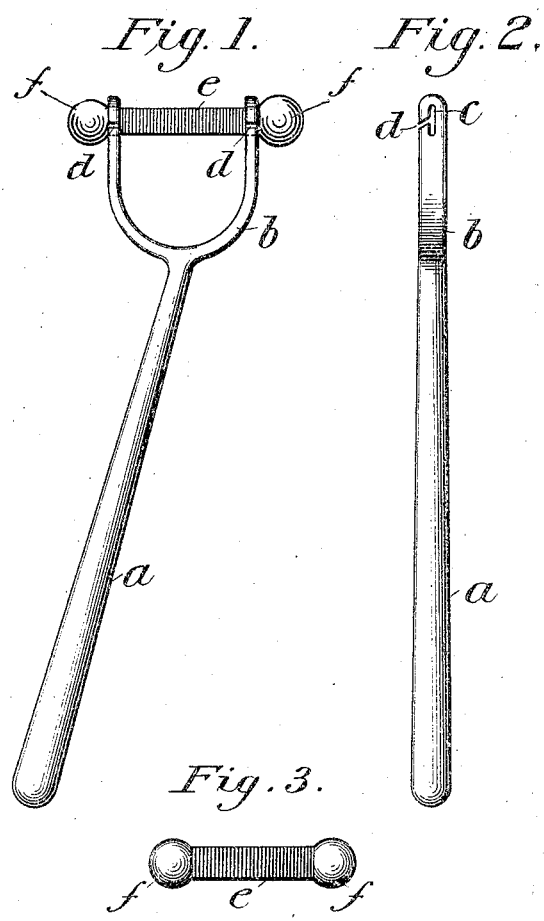

UNITED STATES PATENT OFFICE.

CHARLES F. ROTH, OF CHICAGO, ILLINOIS.

DEVICE FOR REMOVING OBSTRUCTIONS FROM BETWEEN THE TEETH.

SPECIFICATION forming part of Letters Patent No. 788,947, dated May 2, 1905.

Application filed December 14, 1904. Serial No. 236,873.

*To all whom it may concern:*

Be it known that I, CHARLES F. ROTH, a citizen of the United States, residing at Chicago, in the county of Cook, in the State of Illinois, have invented a new and useful Device for Removing Obstructions from Between the Teeth, of which the following is a specification.

My invention relates to a device for removing obstructions from between the teeth, which cannot be accomplished by the ordinary toothpick.

I attain the object by the mechanism illustrated in the accompanying drawings, in which—

Figure 1 is a view of my device. Fig. 2 is a side view of that portion of Fig. 1 showing the two openings for receiving the rubber. Fig. 3 is a view of the rubber.

As shown, my invention comprises a forked handle having the branches $b$ and the handle-bar $a$. The branches $b$ are provided with openings $c$ and with entrance-slots $d$, leading to such openings to facilitate the insertion of a rubber strip $e$ through the slots $d$ into the openings $c$, as will be understood from Figs. 1 and 2 of the drawings. The rubber strip $e$ is expanded or distended when applied to the branches of the fork and is provided at its ends with enlargements or knobs $f$, which by bearing against the outer sides of the branches $b$ of the fork operate as stops to prevent the pulling of the rubber strip through the openings $c$ in the use of the device. It will be seen from Figs. 1 and 3 that the knobs $f$ are spaced apart a distance less than the distance between the outer sides of the branches of the fork and so that when the rubber strip is applied to the forked handle it will be expanded or stretched between the branches, thus putting the rubber strip under tension, so it will operate as desired in removing obstructions from between the teeth.

The handle-bar $a$ is inclined relatively to a center line passed between the branches $b$, and thus adapts the device for use between the teeth of either the upper or lower jaw.

The device is small, can be easily carried in the pocket, and the rubber strip can be readily removed for cleansing purposes and easily replaced, the knobs $f$ operating to prevent any displacement of the rubber strip in use.

Having thus described my invention, what I claim as new, and desire to secure by Letters Patent, is—

A device for removing obstructions from between the teeth, comprising a forked handle having its branches provided with openings and with entrance-slots leading to such openings, a rubber strip adapted to be slipped through such entrance-slots into the openings in the forked branches, knobs fixed on said strip and spaced apart in the normal condition of the strip a distance less than the distance between the outer sides of the branches of the fork, the rubber strip being inserted through the slots in the opposite branches into the openings therein, and the knobs bearing against the outer sides of the branches and forming stops to prevent the pulling of the strip through the openings in the branches and the strip being expanded or stretched when applied, substantially as and for the purposes set forth.

In testimony whereof I have signed my name to this specification in the presence of two subscribing witnesses.

CHARLES F. ROTH.

Witnesses:
 A. M. BUNN,
 G. M. COPENHAVER.